United States Patent
Endo et al.

(10) Patent No.: US 8,371,109 B2
(45) Date of Patent: Feb. 12, 2013

(54) EXHAUST EMISSION CONTROL DEVICE

(75) Inventors: Hiroshi Endo, Hino (JP); Noriyuki Takahashi, Hino (JP)

(73) Assignee: Hino Motors, Ltd., Hino-shi (JP)

(*) Notice: Subject to any disclaimer, the term of this patent is extended or adjusted under 35 U.S.C. 154(b) by 330 days.

(21) Appl. No.: 12/529,024

(22) PCT Filed: Mar. 13, 2008

(86) PCT No.: PCT/JP2008/000581
§ 371 (c)(1), (2), (4) Date: Aug. 28, 2009

(87) PCT Pub. No.: WO2009/016780
PCT Pub. Date: Feb. 5, 2009

(65) Prior Publication Data
US 2010/0132333 A1 Jun. 3, 2010

(30) Foreign Application Priority Data
Jul. 31, 2007 (JP) .................... 2007-199107

(51) Int. Cl.
*F01N 3/035* (2006.01)
(52) U.S. Cl. .................. 60/295; 60/297; 60/301
(58) Field of Classification Search ............ 60/286, 60/301, 295–297, 303
See application file for complete search history.

(56) References Cited

U.S. PATENT DOCUMENTS
5,412,946 A   5/1995  Oshima et al.
6,312,650 B1* 11/2001 Frederiksen et al. ......... 422/180
2003/0108457 A1  6/2003  Gault et al.
(Continued)

FOREIGN PATENT DOCUMENTS
JP   5 106430      4/1993
JP   2007-040224   2/2004
(Continued)

OTHER PUBLICATIONS

Supplemental Search Report issued Jun. 9, 2011 in European Patent Application No. EP 08 72 0467.
U.S. Appl. No. 12/524,889, filed Jul. 29, 2009, Kowada.
U.S. Appl. No. 12/525,689, filed Aug. 4, 2009, Kowada.
U.S. Appl. No. 12/524,727, filed Jul. 28, 2009, Kowada.
U.S. Appl. No. 12/529,929, filed Sep. 4, 2009, Torisaka et al.

(Continued)

*Primary Examiner* — Thomas Denion
*Assistant Examiner* — Jonathan Matthias
(74) *Attorney, Agent, or Firm* — Oblon, Spivak, McClelland, Maier & Neustadt, L.L.P.

(57) ABSTRACT

The invention has its object to realize compact arrangement of particulate filter 5 and selective reduction catalyst 6 for improved mountability on a vehicle while a sufficient reaction time is ensured for generation of ammonia from urea water. In an exhaust emission control device with the filter 5 and the catalyst 6 capable of selectively reacting $NO_x$ with ammonia even in the presence of oxygen being incorporated in an exhaust pipe 4, urea water as reducing agent being addible therebetween, the filter 5 is arranged in a fore-and-aft direction of a vehicle and along a frame 10 of the vehicle. The catalyst 6 is arranged in a vicinity of an inlet end of the filter 5 and directed laterally outward of the vehicle. A communication passage 9 is arranged to guide the exhaust gas 3 discharged from an outlet end of the filter 5 to an inlet end of the catalyst 6 in a forwardly fold-back manner. A urea water adding injector 11 (urea water adding means) for addition of urea water is arranged midway of the passage 9.

13 Claims, 2 Drawing Sheets

U.S. PATENT DOCUMENTS

| | | |
|---|---|---|
| 2003/0110763 A1* | 6/2003 | Pawson et al. .................. 60/286 |
| 2006/0010858 A1 | 1/2006 | Kohler et al. |
| 2007/0160508 A1 | 7/2007 | Doumeki et al. |
| 2008/0264048 A1* | 10/2008 | Nishiyama et al. ............. 60/299 |

FOREIGN PATENT DOCUMENTS

| | | |
|---|---|---|
| JP | 2005 42687 | 2/2005 |
| JP | 2005-256633 | 9/2005 |
| JP | 2007-040221 | 2/2007 |
| JP | 2007 40221 | 2/2007 |
| JP | 2007 40224 | 2/2007 |
| JP | 2007 187089 | 7/2007 |
| WO | WO 01/42630 A2 | 6/2001 |
| WO | WO 2004/069388 A1 | 8/2004 |
| WO | WO 2006057305 A1 * | 6/2006 |

OTHER PUBLICATIONS

U.S. Appl. No. 12/677,957, filed Mar. 12, 2010, Kowada, et al.
U.S. Appl. No. 12/679,677, filed Mar. 24, 2010, Kowada.
U.S. Appl. No. 12/738,994, filed Apr. 21, 2010, Kowada.
U.S. Appl. No. 12/742,321, filed May 11, 2010, Kowada, et al.

* cited by examiner

EXHAUST EMISSION CONTROL DEVICE

TECHNICAL FIELD

The present invention relates to an exhaust emission control device.

BACKGROUND ART

Conventionally, some diesel engines have selective reduction catalyst incorporated in an exhaust pipe through which exhaust gas flows, said catalyst having a feature of selectively reacting $NO_x$ with a reducing agent even in the presence of oxygen. A required amount of reducing agent is added upstream of the reduction catalyst and is reacted on the catalyst with $NO_x$ (nitrogen oxides) in the exhaust gas to thereby reduce a concentration of the discharged $NO_x$.

In a field of industrial plant or the like with flue-gas denitration, it has been well known that ammonia ($NH_3$) is effectively used as reducing agent to reduce and depurate $NO_x$ through reduction. However, for automobiles, safety in carrying ammonia itself during running is difficult to ensure, so that in recent years, use of nontoxic urea water as reducing agent has been researched.

More specifically, when urea water is added to the exhaust gas upstream of the selective reduction catalyst, the urea water is decomposed into ammonia and carbon dioxide gas according to the following equation to thereby depurate $NO_x$ in the exhaust gas well through reduction by ammonia on the catalyst.

$$(NH_2)_2CO + H_2O \rightarrow 2NH_3 + CO_2$$

For exhaust emission control of the diesel engine, mere removal of $NO_x$ in the exhaust gas is insufficient; particulates (particulate matter) in the exhaust gas must be captured through a particulate filter. This kind of particulate filter employed requires to be timely regenerated by burning off the particulates to prevent increase of exhaust resistance due to clogging.

To this end, it has been conceived to additionally arrange flow-through type oxidation catalyst in front of the particulate filter; with accumulation of the particulates becoming increased, fuel is added to the exhaust gas upstream of the oxidation catalyst to forcibly regenerate the particulate filter.

More specifically, when the fuel is added to the exhaust gas upstream of the oxidation catalyst, the added fuel (HC) brings about oxidation reaction during its passing through the oxidation catalyst, so that inflow of the exhaust gas elevated in temperature by the reaction heat of the oxidization elevates a temperature of a catalytic floor of the particulate filter just behind to burn off the particulates, thereby attaining regeneration of the particulate filter.

As actual measures for carrying out the above-mentioned fuel addition, it has been generally conceived that main injection of the fuel near a compression upper dead center is followed by post injection at non-ignition timing after the compression upper dead center so as to add the fuel to the exhaust gas. For effective utilization of the added fuel in forced regeneration of the catalyst and in order to conduct oxidization treatment of the added fuel before substantial lowering in temperature of the exhaust gas, it has been conceived preferable to arrange the particulate filter upstream of the selective reduction catalyst (see, for example, the following Patent Literature 1).

[Patent Literature 1] JP 2005-42687A

SUMMARY OF INVENTION

Technical Problems

However, such arrangement of the particulate filter upstream of the selective reduction catalyst brings about the addition of urea water to the selective reduction catalyst at between the particulate filter and the selective reduction catalyst. As a result, in order to ensure sufficient reaction time for thermal decomposition of the urea water added to the exhaust gas into ammonia and carbon dioxide gas, it is necessary to prolong a distance between an added position of the urea water and the selective reduction catalyst; thus, the particulate filter and the selective reduction catalyst must be substantially spaced apart from each other by an ample distance, which extremely impairs the mountability on a vehicle.

Specifically, since this kind of particulate filter is fitted to a frame extending in a fore-and-aft direction of a vehicle and is arranged along the frame, arrangement of the selective reduction catalyst behind and contiguous with the particulate filter results in a longitudinally wide-ranging occupation as arrangement space of the particulate filter and selective reduction catalyst on the frame, leading to difficulty in ensuring space for arrangement of auxiliary machines such as a urea water tank on the frame.

The invention was made in view of the above and has its object to realize compact arrangement of a particulate filter and a selective reduction catalyst while ensuring enough reaction time for generation of ammonia from urea water, thereby improving mountability on a vehicle.

Solution to Problems

The invention is directed to an exhaust emission control device having a particulate filter incorporated in an exhaust pipe for capturing particulates in exhaust gas and a selective reduction catalyst downstream of said particulate filter and capable of selectively reacting $NO_x$ with ammonia even in the presence of oxygen, urea water as reducing agent being addable between said selective reduction catalyst and said particulate filter, characterized in that it comprises the particulate filter arranged along a frame of a vehicle and in a fore-and-aft direction of the vehicle, the selective reduction catalyst arranged in a vicinity of an inlet end of said particulate filter and directed laterally outward of the vehicle, a communication passage arranged for guidance of the exhaust gas from an outlet end of the particulate filter to an inlet end of the selective reduction catalyst in a forward fold-back manner and urea water adding means provided midway of the communication passage for addition of urea water.

Thus, in this manner, the exhaust gas from the outlet end of the particulate filter is forwardly folded back by the communication passage and is guided at the vicinity of the inlet end of the particulate filter to the inlet end of the selective reduction catalyst directed laterally outward of the vehicle, which ensures a long distance from the added position of the urea water midway of the communication passage to the selective reduction catalyst and facilitates mixing of the urea water with the exhaust gas because of the fold-back of the exhaust gas flow. As a result, sufficient reaction time is ensured for generation of ammonia from the urea water.

The particulate filter and the selective reduction catalyst are arranged to form L-shape in plan view and the communication passage is arranged along the particulate filter, so that the overall construction of the particulate filter, selective reduction catalyst and communication passage becomes compact in size to substantially enhance the mountability on the vehicle.

More specifically, there is no need of ensuring arrangement space for the selective reduction catalyst longitudinally of the frame substantially over the length of the particulate filter; moreover, the particulate filter is arranged laterally inward of the vehicle relative to the frame so that additional arrangement space outward thereof and getting away from the selective reduction catalyst is ensured for possible arrangement of auxiliary machines such as a urea water tank.

Upon carrying out the invention more concretely, it is preferable that the communication passage between the outlet end of the particulate filter and the inlet end of the selective reduction catalyst comprises a gas collection chamber for collecting the exhaust gas from the outlet end of the particulate filter through turnabout to laterally outward of the vehicle and a mixing pipe for extracting forward the exhaust gas collected in the gas collection chamber, said mixing pipe having a terminal end bended to face the inlet end of the selective reduction catalyst, a volume of the gas collection chamber and length and flow cross-sectional area of the mixing pipe being set such that exhaust noise in a low frequency range may be reduced in accordance with principle of resonance decay.

Further, it is preferable in the invention that an oxidation catalyst for oxidation treatment of unburned fuel in the exhaust gas is arranged just in front of the particulate filter, fuel addition means for addition of fuel in the exhaust gas being arranged upstream of the oxidation catalyst; thus, the fuel added by the fuel addition means is oxidized on the oxidation catalyst, so that inflow of the exhaust gas elevated in temperature by reaction heat of the oxidization elevates the catalytic floor temperature of the particulate filter just behind to burn off the particulates, thereby attaining regeneration of the particulate filter.

In this case, it is preferable that a fuel injection device for injection of fuel to respective cylinders of the engine is adopted as fuel addition means, the fuel addition being carried out in such a manner that the fuel injection to the cylinders is controlled to leave much unburned fuel in the exhaust gas.

Moreover, it is preferable in the invention that an ammonia reducing catalyst is arranged just behind the selective reduction catalyst so as to oxidize surplus ammonia; then, ammonia surplus in use of the reduction reaction in the selective reduction catalyst is oxidized in the ammonia reducing catalyst arranged just behind.

Advantageous Effects of Invention

According to the above-mentioned exhaust emission control device of the invention, a variety of excellent effects and advantages as mentioned below can be obtained.
(I) While ensuring enough reaction time for generation of ammonia from urea water, compact arrangement of the particulate filter and selective reduction catalyst can be attained, so that the mountability on the vehicle is substantially improved than ever, auxiliary machines such as a urea water tank being able to be arranged without difficulty along the frame.
(II) With the communication passage comprising the gas collection chamber and the mixing pipe, the volume of the gas collection chamber and the length and flow cross-sectional area of the mixing pipe are properly set so that exhaust noise in a low frequency range can be reduced in accordance with principle of resonance decay. Additional arrangement of a new muffler can become unnecessary by making the communication passage serving as a muffler.
(III) When the oxidation catalyst for oxidation treatment of the unburned fuel in the exhaust gas is arranged just in front of the particulate filter and the fuel addition means for addition of fuel in the exhaust gas is arranged upstream of the oxidation catalyst, the fuel added by the fuel addition means can be oxidized on the oxidation catalyst and the inflow of the exhaust gas elevated in temperature of reaction heat of the oxidization can elevate the catalytic floor temperature of the particulate filter just behind to burn off the particulates, thereby attaining positive regeneration of the particulate filter.
(IV) When the ammonia reducing catalyst for oxidation treatment of surplus ammonia is arranged just behind the selective reduction catalyst, the surplus ammonia having passed through the selective reduction catalyst without reaction can be oxidized to become harmless. As a result, ammonia can be prevented from being left in the exhaust gas to be finally discharged into the air.

| Reference Signs List | |
| --- | --- |
| 1 | diesel engine (engine) |
| 3 | exhaust gas |
| 4 | exhaust pipe |
| 5 | particulate filter |
| 6 | selective reduction catalyst |
| 9 | communication passage |
| 9A | gas collection chamber |
| 9B | mixing pipe |
| 10 | frame |
| 11 | urea water adding injector (urea water adding means) |
| 12 | oxidation catalyst |
| 13 | ammonia reducing catalyst |

DESCRIPTION OF EMBODIMENTS

An embodiment of the invention will be described in conjunction with drawings.

Figure 1:
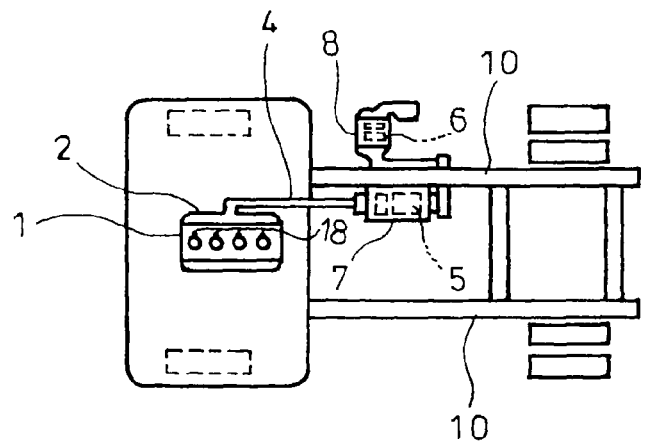
FIG. 1 is a schematic view showing an embodiment of the invention.
Figure 2:
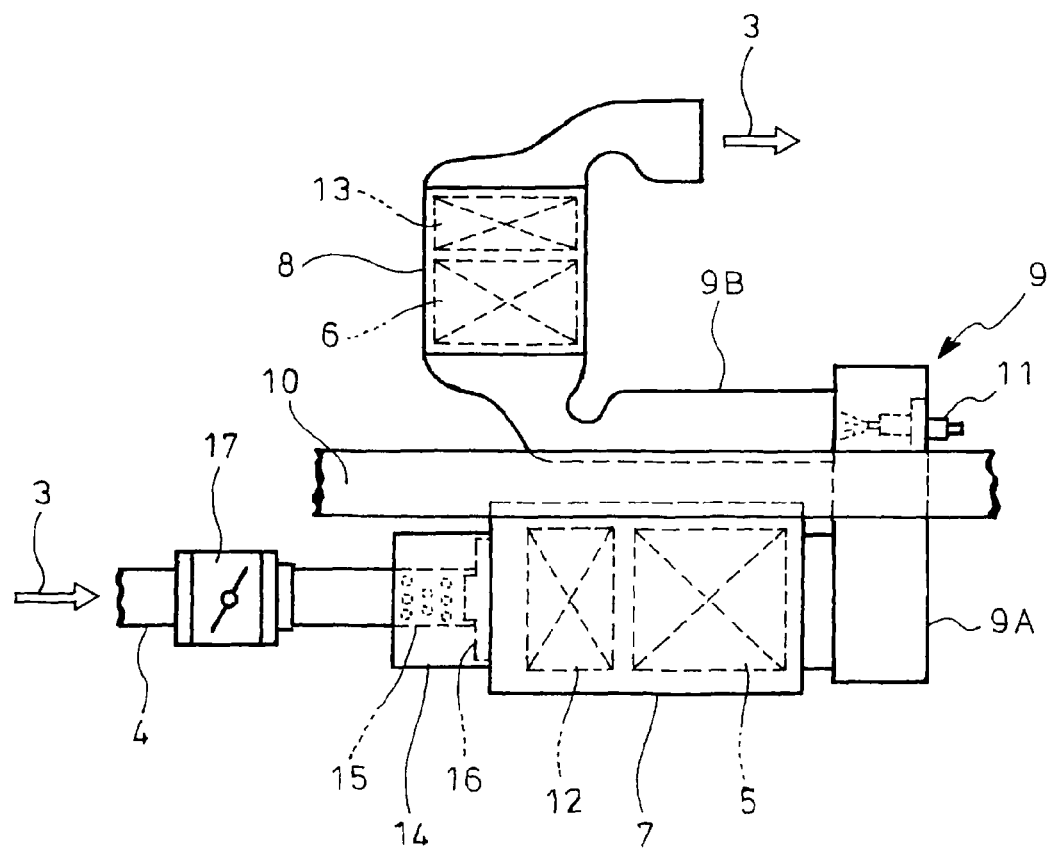
FIG. 2 is a plan view showing in enlarged scale important parts in FIG. 1.
Figure 3:
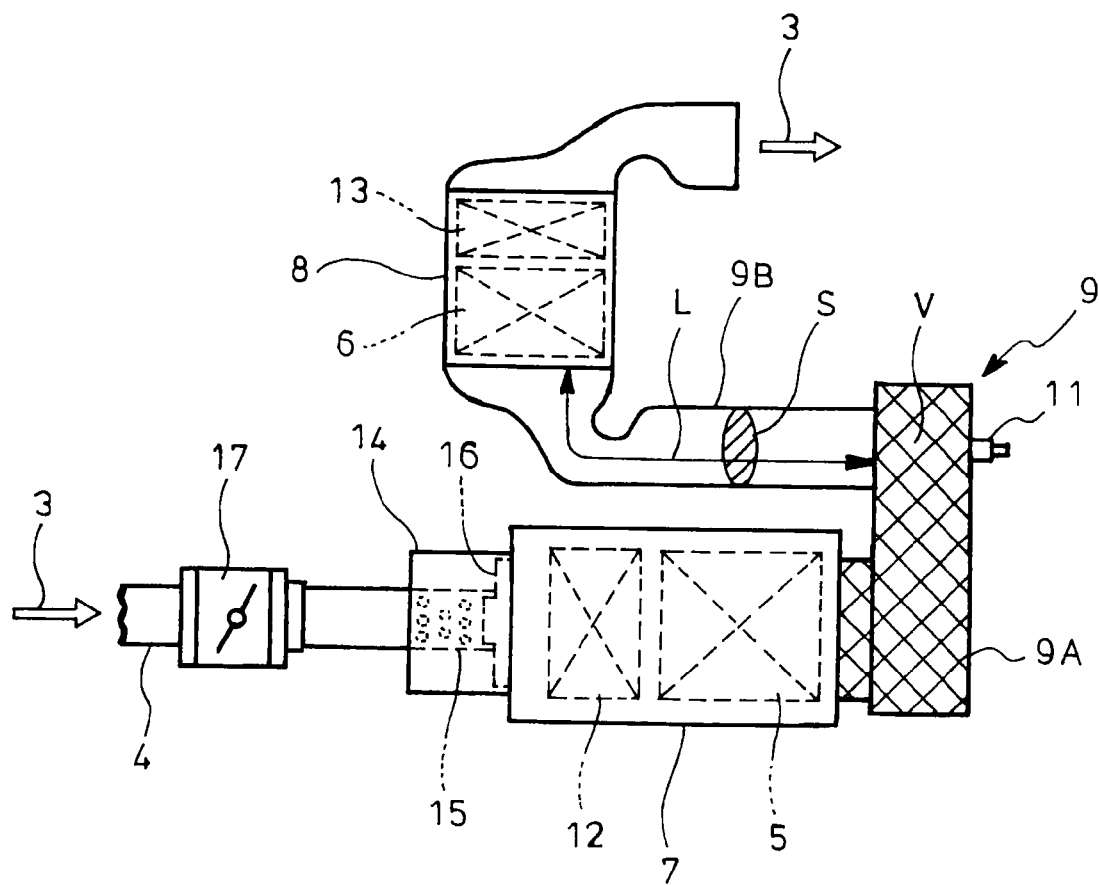
FIG. 3 is a view for explanation of conditions where the communication passage shown in FIG. 2 is made to serve as muffler.

FIGS. 1-3 show the embodiment of the invention. In the exhaust emission control device of the embodiment, a particulate filter 5 for capture of particulates in exhaust gas 3 and a selective reduction catalyst 6 with a property capable of selectively reacting $NO_x$ with ammonia even in the presence of oxygen are encased by casings 7 and 8, respectively, and are incorporated in an exhaust pipe 4 through which the exhaust gas 3 from a diesel engine 1 flows via an exhaust manifold 2, the particulate filter 5 being longitudinally arranged along a frame 10 of a vehicle, the selective reduction catalyst 6 being arranged in a vicinity of the inlet end of the particulate filter 5 and directed to laterally outward of the vehicle.

Moreover, an outlet end of the particulate filter 5 is connected to the inlet end of the selective reduction catalyst 6 by a communication passage 9 such that the exhaust gas 3 from the outlet end of the particulate filter 5 is guided in forward fold-back manner into the inlet end of the selective reduction catalyst 6.

The communication passage 9 comprises a gas collection chamber 9A which collects the exhaust gas 3 discharged from the outlet end of the particulate filter 5 through turnabout of the gas laterally outwardly of the vehicle and a mixing pipe 9B which extract forward the exhaust gas 3 collected in the collection chamber 9A and has a terminal end bended to face the inlet end of the selective reduction catalyst 6. Especially in this embodiment, volume V (see crosshatched parts in FIG. 3) of the gas collection chamber 9A and length L (see arrow L in FIG. 3) and flow cross-sectional area S (see shaded portion in FIG. 3) of the mixing pipe 9B are set such that exhaust noise in a low frequency range (frequency range of explosive components) can be reduced in accordance with principle of resonance decay.

Specifically, resonant frequency f can be expressed by the following equation, so that when the gas collection chamber 9A is made to serve as muffling chamber and volume V of the gas collection chamber 9A and length L and flow cross-sectional area S of the mixing pipe 9B are properly set, a resonator for resonant frequency f corresponding to a low frequency region to be reduced can be constituted by the communication passage 9.

Equation 1

$$f = \frac{C}{2\pi}\sqrt{\frac{S}{L \cdot V}}$$

C: acoustic velocity
π: pi

Moreover, the terminal end of the mixing pipe 9B, which is bended to face the inlet end of the selective reduction catalyst 6 and which tends to have the flow of the exhaust gas 3 biased toward an outer periphery of the bend, is resourcefully shaped for facilitation of the flow of the exhaust gas 3 toward an inner periphery of the bend; a tail pipe at an outlet side of the casing 8 is also shaped so as to uniformize exhaust resistance.

Moreover, a urea water adding injector 11 providing urea water adding means is fitted to a portion of the gas collection chamber 9A facing an opened leading end of the mixing pipe 9B for coaxial alignment with the latter, so that the urea water adding injector 11 serves to add urea water centrally to the opened leading end of the mixing pipe 9B.

However, of course, the positioning of the urea water adding injector 11 is not limited to the position illustrated; any position midway of the communication passage 9 suffices which can ensure sufficient distance to the selective reduction catalyst 6.

Further, particularly in the embodiment, arranged in the casing 7 and in front of the particulate filter 5 is oxidation catalyst 12 for oxidation treatment of unburned fuel in the exhaust gas 3. Arranged in the casing 8 and behind the selective reduction catalyst 6 is ammonia reducing catalyst 13 for oxidation treatment of surplus ammonia.

In the drawings, reference numeral 14 denotes an expansion muffling chamber arranged at inlet side of the casing 7; 15, a punching pipe fitted into the muffling chamber 14 to disperse the exhaust gas 3 from upstream; 16, a dispersion plate arranged at a position where a tip of the punching pipe 15 abuts; and 17, an exhaust brake arranged in front of the muffling chamber 14.

With the exhaust emission control device thus constructed, the particulates in the exhaust gas 3 are captured by the particulate filter 5 and urea water is added to the exhaust gas 3 downstream of the filter by the urea water adding injector 11 and is thermally decomposed into ammonia and carbon dioxide gas, so that $NO_x$ in the exhaust gas 3 is reduced and depurated well on the selective reduction catalyst 6 by ammonia to thereby attain concurrent reduction of the particulates and $NO_x$ in the exhaust gas 3.

In this case, the exhaust gas 3 discharged from the outlet end of the particulate filter 5 is guided through forward fold-back by the communication passage 9 to the inlet end of the selective reduction catalyst 6 directed laterally outward of the vehicle in the vicinity of the inlet end of the particulate filter 5, which ensures a long distance between the added position of the urea water by the urea water adding injector 11 and the selective reduction catalyst 6; fold-back of the flow of the exhaust gas 3 facilitates mixing of the urea water with the exhaust gas 3, so that enough reaction time is ensured for generation of ammonia from urea water.

Since the particulate filter 5 and the selective reduction catalyst 6 are arranged to form L-shape in plan view and the communication passage 9 is also arranged along the particulate filter 5, the overall construction of the particulate filter 5, selective reduction catalyst 6 and communication passage 9 becomes compact in size to thereby substantially improve mountability on the vehicle.

More specifically, there is no need of ensuring arrangement space for the selective reduction catalyst 6 longitudinally of the frame 10 substantially over the length of the particulate filter 5; moreover, the particulate filter 5 is arranged laterally inward of the vehicle relative to the frame 10 so that additional arrangement space for surplus arrangement space outward thereof and getting away from the selective reduction catalyst 6 is ensured for possible arrangement of auxiliary machines such as urea water tank.

Thus, according to the above embodiment, while ensuring enough reaction time for generation of ammonia from urea water, compact arrangement of the particulate filter 5 and selective reduction catalyst 6 can be realized, so that mountability on the vehicle can be substantially improved more than ever and auxiliary machines such as a urea water tank can be arranged along the frame 10 without trouble.

Moreover, with the communication passage 9 comprising the gas collection chamber 9A and the mixing pipe 9B, the volume V of the collection chamber 9A and length L and flow cross-sectional area S of the mixing pipe 9B are properly set so that low-frequency exhaust noise can be reduced in accordance with principle of resonance decay. Additional arrangement of a new muffler can become unnecessary by making the communication passage 9 serving as a muffler.

Further, since the oxidation catalyst 12 for oxidation treatment of the unburned fuel in the exhaust gas is arranged at the inlet of the particulate filter 5 in the embodiment shown, fuel added to the exhaust gas 3 by a fuel injector 18 for example post injection at the side of the diesel engine 1 is oxidized on the oxidation catalyst 12, so that inflow of the exhaust gas 3 elevated in temperature by reaction heat of the oxidation elevates the catalytic floor temperature of the discharge-side particulate filter 5 to burn off the particulates, thereby attaining positive regeneration of the particulate filter 5.

Since the ammonia reducing catalyst 13 for oxidization treatment of surplus ammonia is arranged at the outlet side of the selective reduction catalyst 6, the surplus ammonia having passed through the selective reduction catalyst 6 without reaction can be oxidized to become harmless. As a result, ammonia can be prevented from being left in the exhaust gas 3 to be finally discharged into the air.

It is to be understood that an exhaust emission control device of the invention is not limited to the above embodiment and that various changes and modifications may be made without departing from the scope of the invention.

The invention claimed is:

1. An exhaust emission control device having a particulate filter incorporated in an exhaust pipe for capturing particulates in exhaust gas and a selective reduction catalyst downstream of said particulate filter and capable of selectively reacting $NO_x$ with ammonia even in the presence of oxygen, urea water as reducing agent being addable between said selective reduction catalyst and said particulate filter, the exhaust emission control device comprising:

the particulate filter arranged along a frame of a vehicle and in a forward-and-aft direction of the vehicle, and the particulate filter is arranged laterally inward of the vehicle relative to the frame, the selective reduction catalyst arranged in a vicinity of an inlet end of said particulate filter and directed laterally outward of the vehicle, and the selective reduction catalyst is arranged laterally outward of the vehicle relative to the frame, a communication passage arranged to guide the exhaust gas from an outlet end of the particulate filter to an inlet end of the selective reduction catalyst in a forward foldback manner, the communication passage connecting the outlet end of the particulate filter with the inlet end of the selective reduction catalyst and including a gas collection chamber to collect the exhaust gas discharged from the outlet end of the particulate filter through turnabout of the exhaust gas laterally outward of the vehicle and a mixing pipe which extracts forward the exhaust gas collected in said gas collection chamber and which has a terminal end bended to face the inlet end of the selective reduction catalyst, and a urea water adding device provided at a midway of the communication passage to add urea water, the gas collection chamber including the urea water adding device, and the urea water adding device being arranged upstream of the mixing pipe.

2. An exhaust emission control device as claimed in claim 1, wherein a volume of the gas collection chamber and a length and flow cross-sectional area of the mixing pipe are set to reduce exhaust noise in a low frequency range in accordance with a principle of resonance decay.

3. An exhaust emission control device as claimed in claim 2, wherein oxidation catalyst for oxidation treatment of unburned fuel in the exhaust gas is arranged just in front of the particulate filter, and a fuel addition device to add fuel in the exhaust gas is arranged upstream of said oxidation catalyst.

4. An exhaust emission control device as claimed in claim 3, wherein a fuel injection device that injects fuel to respective cylinders of an engine is employed as the fuel addition device, the fuel injection to the cylinders being controlled to conduct fuel addition in the form of leaving much unburned fuel in the exhaust gas.

5. An exhaust emission control device as claimed in claim 4, wherein ammonia reducing catalyst for oxidation treatment of the surplus ammonia is arranged just behind the selective reduction catalyst.

6. An exhaust emission control device as claimed in claim 3, wherein ammonia reducing catalyst for oxidation treatment of the surplus ammonia is arranged just behind the selective reduction catalyst.

7. An exhaust emission control device as claimed in claim 2, wherein ammonia reducing catalyst for oxidation treatment of the surplus ammonia is arranged just behind the selective reduction catalyst.

8. An exhaust emission control device as claimed in claim 1, wherein oxidation catalyst for oxidation treatment of unburned fuel in the exhaust gas is arranged just in front of the particulate filter, and a fuel addition device to add fuel in the exhaust gas is arranged upstream of said oxidation catalyst.

9. An exhaust emission control device as claimed in claim 8, wherein a fuel injection device to inject fuel to respective cylinders of an engine is employed as the fuel addition device, the fuel injection to the cylinders being controlled to conduct fuel addition in the form of leaving much unburned fuel in the exhaust gas.

10. An exhaust emission control device as claimed in claim 9, wherein ammonia reducing catalyst for oxidation treatment of the surplus ammonia is arranged just behind the selective reduction catalyst.

11. An exhaust emission control device as claimed in claim 8, wherein ammonia reducing catalyst for oxidation treatment of the surplus ammonia is arranged just behind the selective reduction catalyst.

12. An exhaust emission control device as claimed in claim 1, wherein ammonia reducing catalyst for oxidation treatment of the surplus ammonia is arranged just behind the selective reduction catalyst.

13. An exhaust emission control device as claimed in claim 1, wherein the particulate filter and the selective reduction catalyst are arranged to form an L-shape in plan view, and the communication passage is arranged along the particulate filter.

* * * * *